United States Patent Office 2,770,264
Patented Nov. 13, 1956

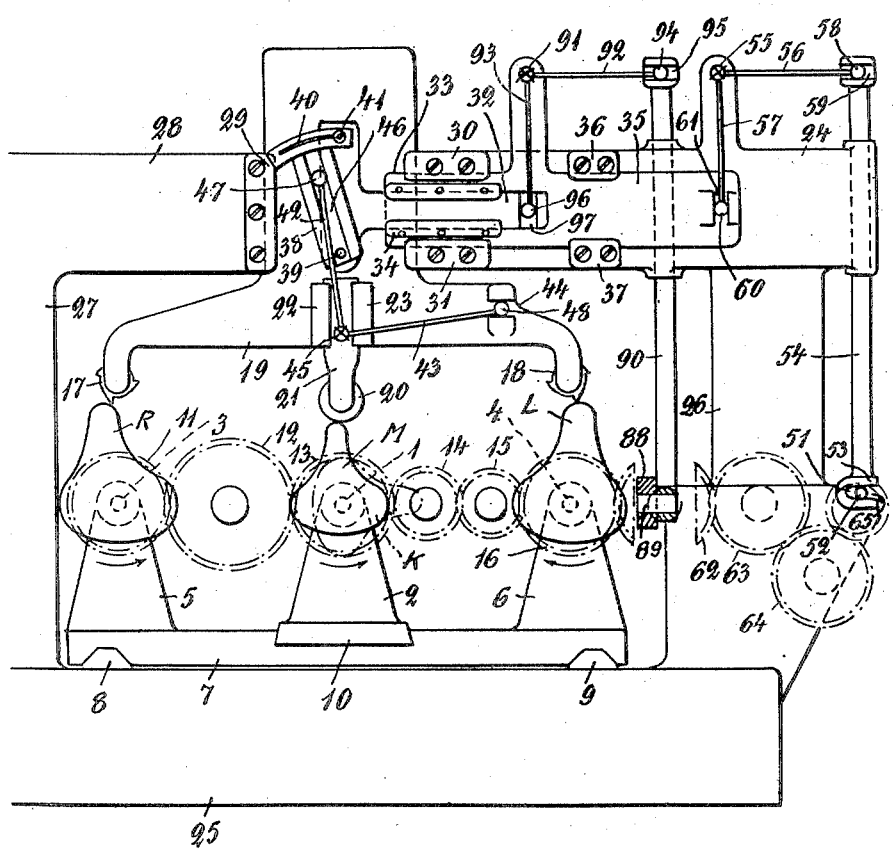

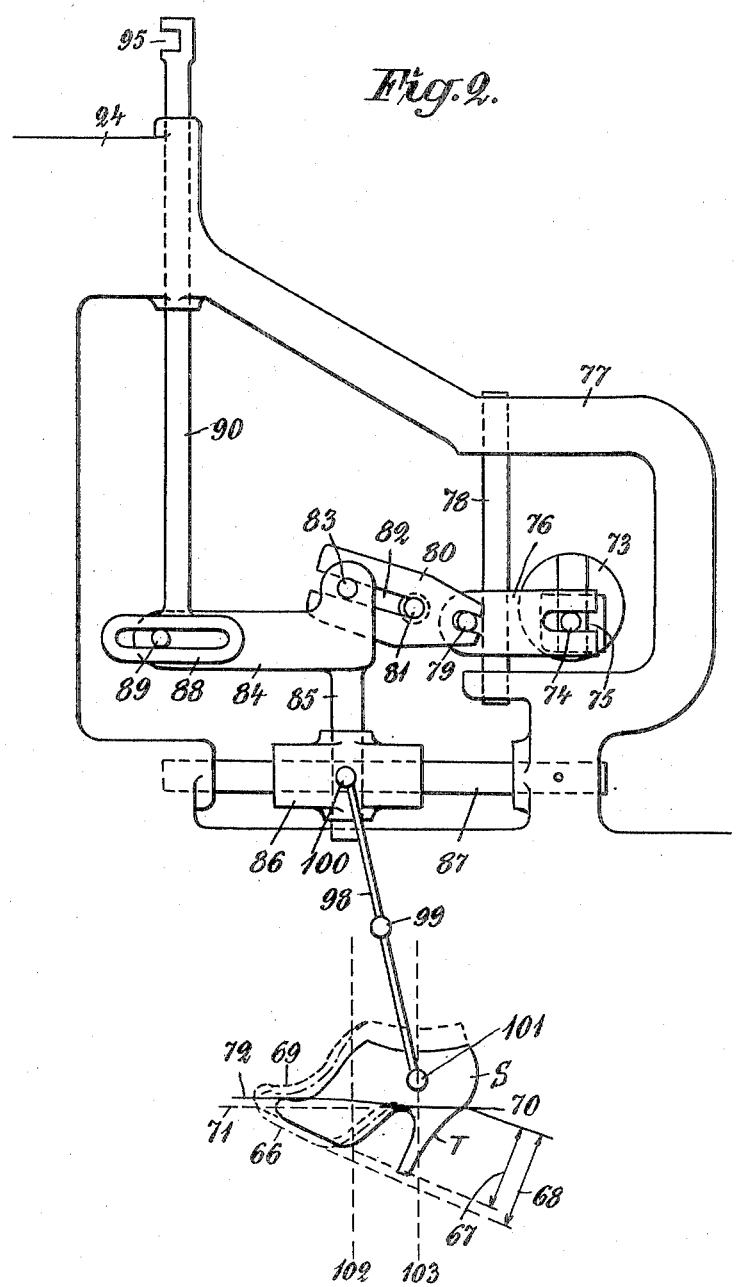

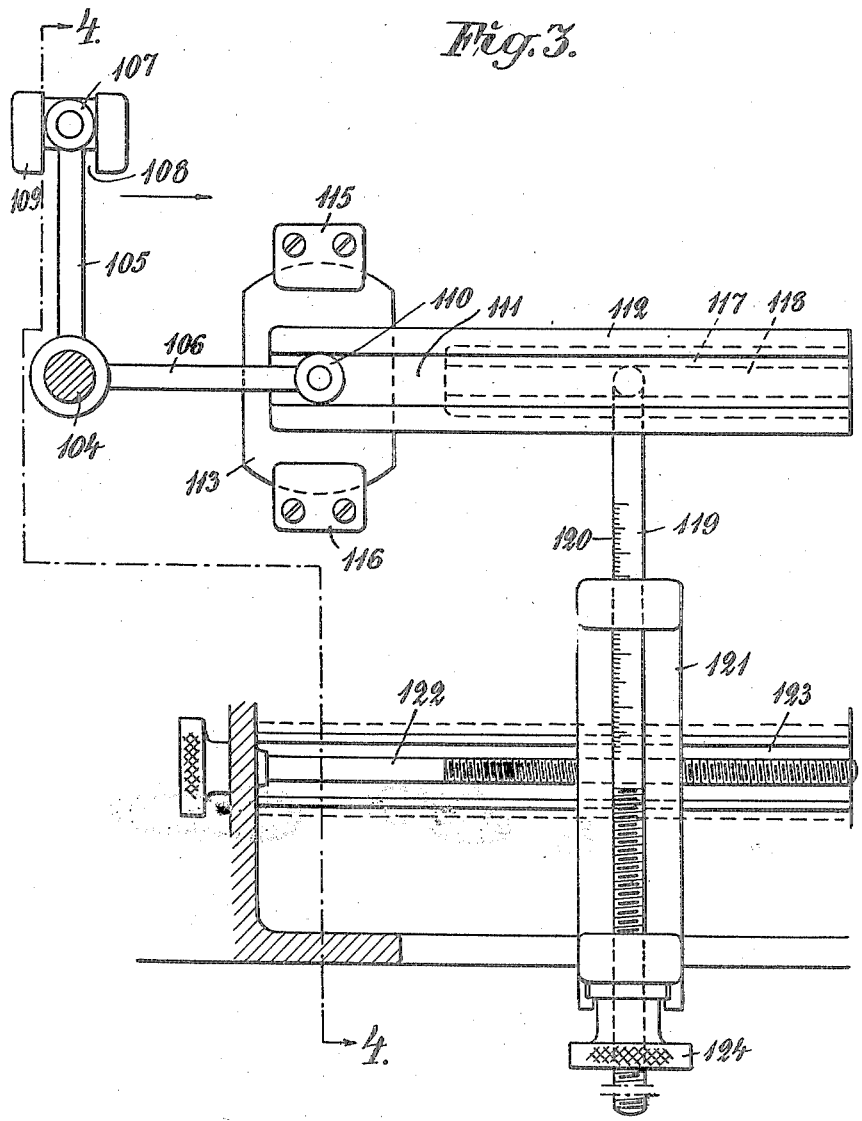

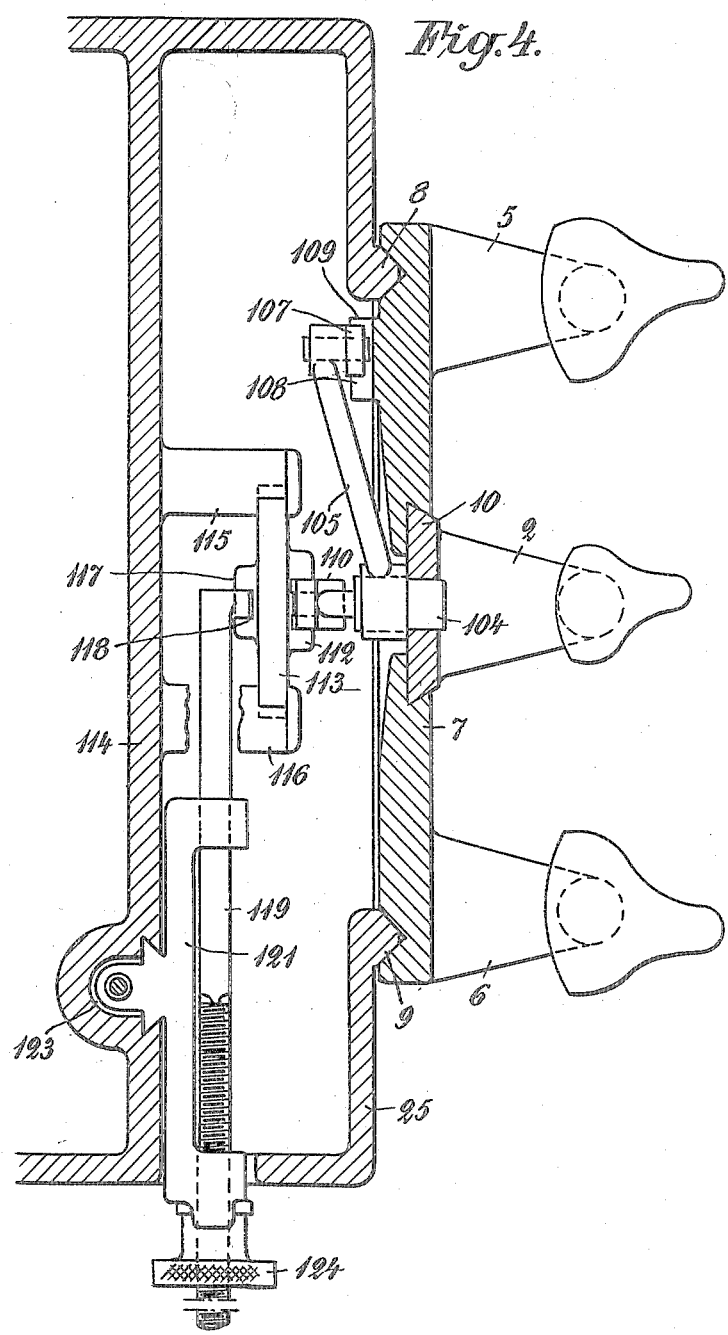

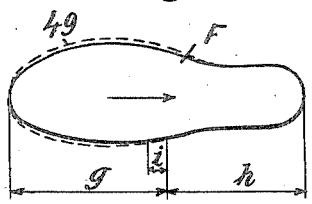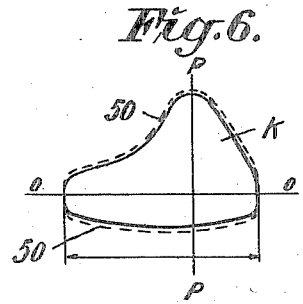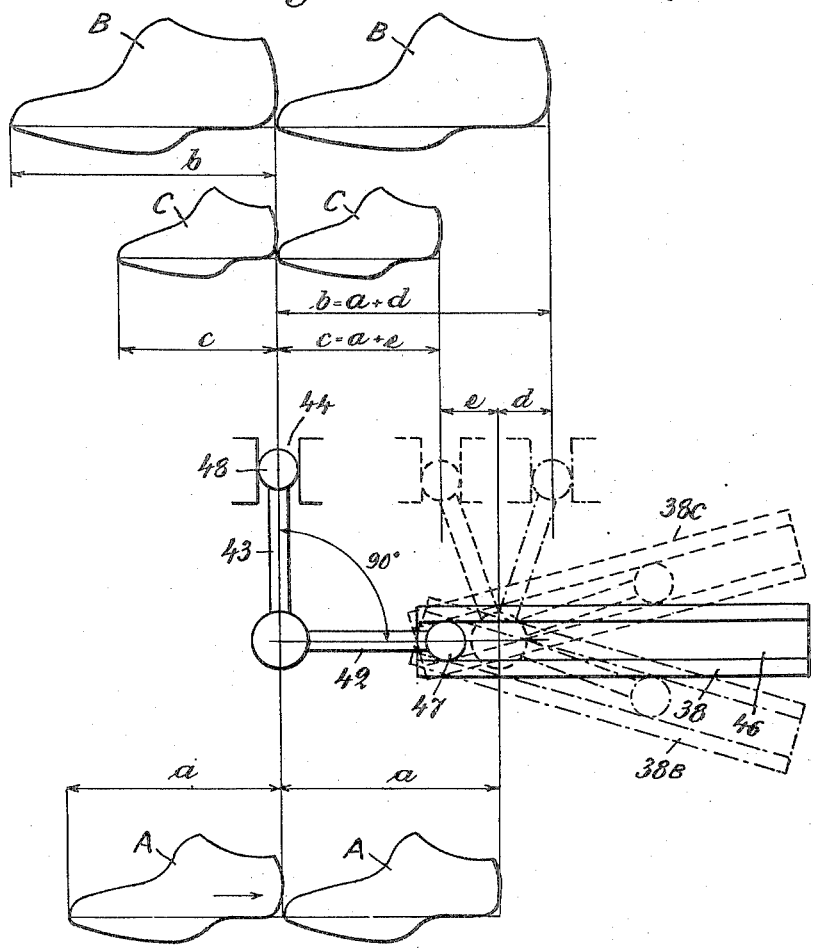

2,770,264

MACHINES FOR THE MANUFACTURE OF SHOE LASTS AND SIMILAR MOULDED BODIES

Carl Hjalmar Eklund, Stockholm, Sweden

Application April 14, 1953, Serial No. 348,677

5 Claims. (Cl. 142—15)

The present invention relates to machines for the manufacture of shoe lasts and similar bodies by mechanical copying of a pattern last. The object of the present invention is to facilitate the manufacture of lasts deviating in size and shape from the pattern last in various ways, and the invention particularly aims at providing an automatic control of the cycle of operations, in a manner such that various desired changes with respect to size and shape may be performed in different stages during a continuous feed of the last blank in the longitudinal direction thereof. According to the invention, a machine for the manufacture of shoe lasts and similar bodies comprises a rotary model last holder, a rotary last blank holder, a model follower, a cutting tool holder, a primary width grading mechanism operated by the model follower, and at least one secondary width grading mechanism connected with the primary width grading mechanism and operating to impart to the cutting tool holder an additional motion increment superimposed on the motion imparted by the primary width grading mechanism.

The invention is illustrated in the accompanying drawings which disclose a last lathe according to one form of embodiment of the invention in diagrammatic representation. Fig. 1 is a front view of the machine. Fig. 2 is a view of a control mechanism associated with the machine and viewed at right angles to the front side thereof. Fig. 3 is a plan view and Fig. 4 a section on line 4—4 in Fig. 3 of a control mechanism arranged in the bottom portion of the machine. Fig. 5 is a plan view and Fig. 6 an endwise view of a last. Fig. 7 is a diagram illustrating the principle of making an enlarged or reduced last.

The manufacture of the pattern lasts is carried out in a manner known per se with the use of a pattern last adapted to control the movement of the tools, cutters or the like, by means of which the last blanks are shaped. The pattern last M, which is viewed in Fig. 1 from the fore end thereof, is mounted on a shaft 1, which is rotatably mounted in a bearing pedestal 2. Blanks of a right-foot last R and a left-foot last L are mounted in a similar manner on shafts 3, 4 paralleling the shaft 1 of the pattern last, said shafts 3, 4 being rotatably mounted in pedestals 5, 6, which are rigidly arranged on a table 7, which is displaceable in guides 8, 9 in a direction paralleling the axes of rotation of the pattern last and the last blanks. The bearing pedestal 2 is for the purpose of longitudinal correction arranged on a slide 10 displaceable in the table 7 in parallel with the guides 8, 9, said slide being movable in the axial direction of the pattern last. The shafts 1, 3 and 4 are coupled to each other by means of gear wheels 11, 12, 13, 14, 15 and 16, in a manner such that the pattern last M and the right-foot last R rotate in the same direction, whereas the left-foot last blank L rotates in the opposite direction, as indicated by arrows. The last blanks rotate at the same speed as the pattern last. By means of a feeding device not shown in the drawing, the table 7 with the lasts mounted thereon may be displaced in the axial direction of the lasts. The shaping of the last blanks R and L is performed by means of cutters 17, 18, which are rotatably mounted in a tool slide 19 adapted to be displaced up and down in the vertical direction under the control of a pattern wheel 20 bearing on the pattern last M, said pattern wheel being mounted to rotate freely in a pattern slide 21. The latter is displaceably guided in the direction of movement of the tool slide 19 by means of guides 22, 23 arranged in the tool slide. The cutters 17, 18, which have the same diameter as that of the pattern wheel 20, are adapted to be driven by a driving contrivance, not shown. When the pattern last and the last blanks rotate, the pattern wheel 20 will be kept bearing on the surface of the pattern last on account of the weight of the tool slide, which latter then moves up and down together with the pattern wheel, simultaneously with the feeding of the lasts in the longitudinal direction. In this way the last blanks R and L obtain the configuration of the pattern last, but since they rotate in opposite directions, they will be shaped to form mirror images of one another.

With the aid of a system of control slides, the movements of the tool slide may be controlled in such manner that the last blanks will deviate in shape from the configuration of the pattern last in various ways. These control slides are mounted in a slide frame 24, which is carried by a frame member 26 located laterally of the tool slide and extending from the foundation 25 of the machine. Extending from the opposite side of the foundation 25 is a frame arm 27 having a horizontal portion 28 corresponding to the slide frame 24. The tool slide 19 is guided in guides 29 and 30, 31 on the ends of the arm 28 and the slide frame 24 located opposite one another. A slide 32 movable at right angles to the tool slide 19 is displaceably mounted in two guides 33, 34 on a main slide 35, which is in turn likewise movable at right angles to the tool slide 19 while being guided in the guides 30, 31 and in guides 36, 37. The slide 32 carries at the outer free end thereof a guide 38 which is swingable about a pin 39 and permits of being adjusted and locked in an arbitrary angular position by means of a clamping screw 41 extending through a slot 40 in the outer end of the slide. The guide serves to guide the one arm 42 of a bell crank lever, the other arm 43 of which is guided in a slot 44 of the tool slide 19. The bell crank lever 42, 43 is swingably mounted on a pin 45 rigidly secured in the pattern slide 21. The lever arm 42 is guided in a slot 46 of the guide 38 by means of a trundle 47 mounted at the outer end of the arm and engaging said slot. In a similar manner the arm 43 engages the slot 44 extending at right angles to the direction of movement of the tool slide, by means of a trundle 48.

By adjustment of the swingable guide 38 into various angular positions, an all-over enlargement or reduction of the lasts R and L relatively to the pattern last may be obtained in the following manner. To begin with, it may be assumed that the guide 38 is adjusted in the direction of movement of the pattern slide 21, the pivot center 45 of the bell crank lever 42, 43 being then located on the extension of the center line of the slot 46, as shown with full-drawn lines in Fig. 7, which diagrammatically illustrates the connection between the size of the lasts and the angular adjustment of the guide 38. In said position of the guide 38, the tool slide 19 is rigidly coupled to the slide 21 through the bell crank lever 42, 43, in a manner such that the tool slide 19 participates in the movement of the slide 21, no relative movement consequently taking place between the tool slide 19 and the pattern slide 21, or between the cutters 17, 18 and the pattern wheel 20, respectively. Otherwise, the arrangement is such that, when the pattern wheel is located with the lower edge thereof on a level with the geometric axis of rotation of the pattern last, the trundle 47 will be in a position coaxial to the oscillatory axis 39 of the guide 38. In said position of the guide 38, the pattern last M will thus be copied into right-foot and left-foot lasts R and L, respectively, without any enlargement or reduction.

In Fig. 7, A designates the pattern last, B two enlarged lasts corresponding thereto, and C two corresponding reduced lasts. If the length of the pattern last is designated by $a$, the length of the enlarged last by $b$, and the length of the reduced last by $c$, then $b-a=d$ constitutes a measure of the enlargement and $a-c=e$ a measure of the reduction. For the production of an enlarged last, the guide 38 is adjusted into a position angularly displaced to the left in Fig. 1. In Fig. 7, this position corresponds to the position 38B indicated by chain-dotted lines. When the pattern last M rotates, the bell crank lever 42, 43 will, on account of the oblique position of the guide 38, perform an oscillatory movement in time with the vertical oscillatory movement of the pattern wheel, in a manner such that the tool slide 19 obtains an additional increment of movement relatively to the pattern slide 21, said increment increasing proportionately to the movement of the pattern wheel 20 outwardly from the axis of rotation of the pattern last, and decreasing in a corresponding degree, when the pattern wheel moves inwardly toward the axis of rotation. As will be readily understood, the additional increment of the movement will be proportional to the radial distance between the axis of rotation of the pattern last and the bearing point of the pattern wheel on the surface of the pattern last. The consequent result is that the formed lasts are enlarged on all sides and uniformly with the pattern last in all directions at right angles to the longitudinal axis of the lasts. In a similar manner, a reduction may be effected by shifting the guide 38 to the right in Fig. 1 from the middle position or to the position denoted by 38C in Fig. 7, the degree of enlargement and reduction then depending on the magnitude of the angular adjustment of the guide 38. In connection with the alteration of the width of the last, the same will have to be elongated or shortened in a corresponding degree in the direction of the axis of the last. The relevant requisite control of the feeding of the lasts, the so-called longitudinal gradation, will be explained more closely hereinbelow with reference to Figs. 3 and 4. The mechanism so far described constitutes the primary width grading mechanism above referred to.

The all-round and uniform alteration of the width of the last obviously implies that the swingable guide 38 is maintained in an unaltered angular position during the whole of the feeding movement in the longitudinal direction, and that the slide 32 carrying the guide 38 is maintained in the position shown in Fig. 1 relatively to the pattern slide 21. However, by a displacement of the slide 38 and of the slide 35 carrying the slide 32, the guide 38 may be adjusted laterally while the forming of the lasts is going on, in a manner such that the shape of the last will deviate from that of the pattern last in various respects. This may be brought about by means of secondary width grading mechanisms in cooperation with the primary width grading mechanism, as will be described hereinafter. For example, it might be desirable in connection with certain patterns to undertake a partial enlargement of the width, so that only the front portion of the last is enlarged, for example, or so that the width of the heel portion is increased by an increment, while the front portion is increased by a greater increment. Such an alteration of the shape is illustrated in Fig. 5, which by full-drawn lines represents a right-foot last F of a normal configuration, whereas the dashed lines 49 indicate the desired enlargement of the front portion, the length $h$ then corresponding to that portion of the last which is to present the normal measure, whereas the length $g$ corresponds to the portion of the last which is to be given an increased width. In that connection, the heel portion is first formed according to the length $h$ to a normal size, whereas the guide 38, Fig. 1, may be adjusted either into a vertical position or into a position somewhat angularly displaced to the left, depending on whether the heel portion is to agree in size with the pattern or is to be enlarged relatively to the same. During the continued movement of the last in the direction of the arrow for a distance corresponding to the distance $i$ the slide 32, Fig. 1, is displaced successively to the left, the width being thus successively increased. After that, the slide 32 remains stationary in the position thus reached, while the forming operation is proceeded with at an enlargement of the front portion of the last corresponding to said position, over the length $g-i$. This enlargement is equal in all directions. It should be observed that an enlargement or reduction obtained in this manner by an adjustment of the slide 32 is independent, with respect to the magnitude thereof, of the radial distance of the pattern trundle 20, whereas an angular adjustment of the guide 38, as above mentioned, brings about an enlargement or reduction varying with the radial distance. A contrivance for the effectuation of said adjustment of the slide 32 will be described hereinbelow with reference to Fig. 2.

By imparting an oscillatory movement to the slide 32 or to the slide 35, or to both slides, further alterations in shape may be brought about. Such an alteration in shape is shown in Fig. 6, which illustrates a case where the last is to be made of a width varying within certain limits for a given length. In order that it shall not then be necessary to change the shape of the sole, the width of the last must be maintained unaltered in the direction O—O, while the width is increased in the direction P—P, as indicated by dashed lines 50. This will be obtained by imparting an oscillatory movement to the slide 35, while the slide 32 maintains the position shown in Fig. 1 relatively to the slide 35, the movement of the slide 35 being then synchronized with the movement of the tool slide 19, in a manner such that the slide 35 is caused to oscillate at a periodicity twice the number of revolutions of the last. This movement is produced by means of an eccentric 51, which is coupled by means of an eccentric pin 52 and a guide 53 to a vertical rod 54 displaceably mounted in the frame 24, said rod being in turn coupled to the slide 35 by means of a bell crank lever 56, 57, which is swingably mounted in the frame 24 as at 55, one arm 56 of said bell crank lever engaging by a trundle 58 into a horizontal slot 59 in the upper end of the rod 54, and the other arm 57 of which engages with a trundle 60 into a vertical slot 61 of the slide 35. The eccentric 51 is coupled to the rotary shafts of the lasts by means of gear wheels 62, 63, 64 and 65, in a manner such that the eccentric 51 is caused to rotate at a number of revolutions twice that of the shafts of the lasts. The pattern last K, Fig. 6, is represented in Fig. 1 by chain-dotted lines. In this position of the pattern last, the eccentric pin 52 takes its uppermost position, the slide 35 then taking its extreme right-hand position. Before that, the swingable guide 38 has been adjusted into its vertical middle position, in which the angle arm 42 takes a vertical position, the cutters 17, 18 being then located at a distance from the axes of the last blanks corresponding to the distance of the pattern trundle 20 from the axis of the pattern last. While the lasts move by a quarter of a revolution from the position shown in Fig. 1, the eccentric 51 moves by half a revolution, the slides 35 and 32 and the guide 38 then moving from their extreme right-hand position into the extreme left-hand position, in which the cutters 17, 18 are located at a distance from the axes of the last blanks greater than the distance of the pattern trundle 20 from the axis of the pattern last, corresponding to the maximum enlargement along line P—P in Fig. 6. During the next quarter of a revolution of the lasts, the slides 35, 32 and the guide 38 are displaced back into their extreme right-hand position. During the remaining portion of the revolution, a similar adjustment of the slides and the guide 38 takes place to and fro. Through this motion contrivance, an enlargement of the width will thus be obtained in the direction P—P in Fig. 6, while the width remains unaltered in the direction O—O.

In the manufacture of a series of lasts of different sizes, it is desirable that the height of the heel be maintained unchanged for all sizes. The configuration of the last will then have to be adapted to the height of the heel. This may be effected by means of the mechanism shown in Fig. 2. The bottom part of this figure shows a last S with a heel T, the full-drawn lines indicating the configuration of the pattern last. A uniform enlargement of this last represented by full-drawn lines would result in a last of the approximate shape shown by the chain-dotted line 66, and the difference in height of the heel would then become equal to the difference between the measures 67 and 68. It is thus necessary in the manufacture to bring about a deflection of the last in an upward direction, as shown by the dashed line 69. This alteration in shape is called coordination. The alteration in shape involves an apparent raising of the axial line about which the last blank rotates, from the line 70—71 to the line 72. This may be brought about by a relative displacement of the pattern wheel 20 and the slide 21 thereof relatively to the tool slide 19 synchronously with the rotary movement of the lasts, for which purpose the slide 32 and the guide 38 are caused to move backwards and forwards once for each revolution of the rotary movement of the lasts.

This oscillatory movement is produced by means of an eccentric 73, Fig. 2, which rotates at the same number of revolutions as the lasts. The eccentric 73 engages by an eccentric pin 74 into a slot 75 of a runner 76 which is displaceably guided on a rod 78 rigidly arranged in the frame member 77. The runner 76 is provided with a pin 79 engaging a slot of an arm 80, which is swingable about a fixed pin 81, and which is provided with a guide slot 82 extending radially from the pin 81, said slot receiving a pin 83 on a transmission member 84. The transmission member 84 is vertically displaceable by means of a rod 85 in a runner 86, which is laterally displaceable on a guide rod 87 rigidly secured in the frame. By means of a pin 89 on the transmission member 84 engaging a slot guide 88, the vertical movement of the transmission member is transmitted to a rod 90, which is vertically displaceable in the frame 24 and connected at the upper end thereof to the slide 32 through a bell crank lever 92, 93 swingably mounted on the slide 35 as at 91, one arm 92 of said bell crank lever engaging with a trundle 94 into a horizontal slot 95 in the end of the rod 90, and the other arm 93 of the bell crank lever engaging with a trundle 96 into a vertical slot 97 in the slide 32.

The synchronization of the rotary movements of the lasts and the eccentric 73 is such that the eccentric pin 74 will be in its uppermost position when the lasts take the position shown in Fig. 1, with the upper side thereof turned straight upwardly, and in its lowermost position, when the lower sides of the lasts are turned straight upwardly. When the eccentric pin 74 is in its intermediate position, the slot 82 in the arm 80 takes a horizontal position, Fig. 2. The transmission member 84 is adapted to be adjusted laterally by means of a lever 98, which is swingable about a shaft 99 rigidly mounted in the frame, and which is pivotally connected at one end 100 thereof to the runner 86. The other end 101 of said lever is adapted to be actuated by the motion contrivance whereby the pattern last is advanced in its longitudinal direction. In the example in consideration, however, said lever 98 is actuated only during the movement of the last between two fixed vertical planes 102 and 103, Fig. 2, in order to bring about an apparent successive elevation of the line 70—71 into the position 72 over a corresponding longitudinal portion of the last.

During the first portion of the movement of the last corresponding to the heel portion of the last no coordination is thus to take place. Consequently, an oscillatory movement shall also not be imparted to the cylinder 32, which thus remains stationary, for instance in the position shown in Fig. 1, during the forming of the heel portion, the guide 38 then taking an angular position corresponding to the desired enlargement.

During the forming of the heel portion, the lever 98 Fig. 2, has the end 101 thereof coinciding with the plane 102, the transmission member 84 being then in its initial position with the pin 83 located in a position coaxial to the fixed pin 81. In this position the transmission member 84 is inoperative, and no oscillatory movement is transmitted to the slide 32. When the last has been advanced so far that the forming of the heel portion is finished, the lever 98 will be actuated by the feeding mechanism, the transmission member 84 being then displaced to the left, while the pin 83 is displaced outwardly in the slot 82. By reason of this an oscillatory movement is now imparted to the transmission member 84 and thus to the slide 32, which will then move to and fro by the same amount in each direction from the previously assumed intermediate position. The amplitude of said oscillatory movement is increased proportionately to the displacement of the transmission member 84 to the left. Through this oscillatory movement the tool slide 19 will have an additional motion increment imparted to the same during one half of every revolution performed by the lasts, and will have a corresponding reduction of the movement imparted to the same during the other half of the revolution, in a manner such that the cutters 17, 18 will be displaced outwardly from the axes of rotation of the lasts during one half of the revolution, and will be displaced inwardly toward the axes during the other half of the revolution. Hereby, an elevation of the portion of the last following after the heel portion will be brought about, said elevation proceeding successively, according as the transmission member 84 is displaced to the left, inasmuch as the upper and lower sides of the last will be raised proportionately to the distance of displacement of the pin 83 out in the slot 82, whereby the amplitude of the oscillatory movement is increased. When the feeding of the pattern last has proceeded so far that the end 101 of the lever 98 reaches the plane 103, the lever 98 will be released from the feeding mechanism so as then to remain standing in this position. The axis of rotation of the last has thus been apparently raised into the position 72. During the continued feeding movement the remaining front portion of the last is formed without any further elevation of the last, inasmuch as the slide 32 performs its oscillatory movement while the transmission member 84 remains in its left extreme position.

If the coordination is to take place without any alteration of the width of the sole or the last, the eccentric 51, Fig. 1, may be caused to operate simultaneously with the mechanism according to Fig. 2. When coordination is not to take place, the eccentric 73 is disengaged. If the width of the last is to be increased without any simultaneous coordination in the manner described with reference to Fig. 5, this may take place automatically by the locking of the arm 80, Fig. 2, in an angular position such that the slot 82 is directed obliquely downwards. The lever 98 is then arranged to be actuated by the feeding mechanism of the last during the passage of the longitudinal portion *i*, Fig. 5, a successive enlargement being brought about by the fact that the pin 83, Fig. 2, of the transmission member 84 is displaced radially outwards in the slot 82, the rod 90 being thus lowered and the slide 32 displaced to the left. After said longitudinal portion *i* has been passed, the slide 32 remains standing in the position thus taken.

By adjusting the guide 38 from the beginning into its vertical position right above the pattern slide 21 and by then imparting to the guide 38 an oscillatory movement about this initial position as an average position by means of the slide 32 with the use of the mechanism shown in Fig. 2, a deflection of the last will be obtained without any simultaneous enlargement. If the last is to be enlarged at the same time, this is effected by an angular adjustment of the guide 38 or by causing the slide 32 to oscillate about an average position of the guide 38 displaced to the left or by a simultaneous utilization of both of these expediencies.

By a modification of the mechanism shown in Fig. 2 it is possible to bring about a continuous enlargement or reduction of the last, while the latter is continuously deflected at the same time. To this end, the swinging pin 81 of the arm 80 may be vertically adjustable, so that the radial slot 82 may be caused to take an obliquely downwardly or obliquely upwardly inclined position, when the eccentric pin 74 takes its vertical middle position on a level with the center of rotation of the eccentric, while the latter is adjusted relatively to the lasts in the manner hereinbefore described, so that the eccentric pin 74 will take its uppermost position, when the lasts take the position shown in Fig. 1. According as the transmission member 84 moves to the left during the movement of coordination, the swinging amplitude will then increase continuously at a simultaneous continuous displacement of the middle position of the oscillatory movement, inasmuch as the slide 32, Fig. 1, is continuously displaced to the left and right in correspondence to the inclination of the slot 82, Fig. 2, in the middle position of the arm 80.

To adapt the length of the last to the desired enlargement or reduction it is necessary during the feeding of the last blanks to bring about a mutual displacement of the pattern last and the last blanks in the longitudinal direction. This is effected by means of the mechanism shown in Figs. 3 and 4, which is arranged within the foundation 25 of the machine frame. A bell crank lever 105, 106 is swingably mounted on a pin 104 in the slide 10 mounted in the table 7, on the lower side of the slide. One arm 105 of said bell crank lever engages by a trundle 107 into a slot 108 on the lower side of a boss 109 projecting from the table 7. The other arm 106 of the bell crank lever engages with a trundle 110 into a slot 111 on the upper side of an arm 112, which is swingably mounted by means of a plate 113 in slots on the inside of two posts 115, 116 extending from the bottom 114 of the frame. In the initial position of the pattern last and the last blanks, the angle arm 106 is located with its outer end right above the swinging center of the arm 112. The arm 112 is provided on the lower side thereof with a bar 117 provided with a slot 118 extending in parallel with the slot 111 on the opposite side of the arm. The upwardly directed outer end of an adjusting screw 119 engages the slot 118, said adjusting screw being preferably provided with a graduation 120. The screw is displaceably mounted in a bearing pedestal 121, which may be displaced by means of a screw 122 in a slide groove 123 in the bottom 114 of the frame, said slide groove paralleling the direction of movement of the table 7. By means of a nut 124 threaded onto the end of the screw 119 this screw may be displaced in its longitudinal direction in the bearing pedestal 121 for the purpose of shifting the arm 112 into an angular position corresponding to the desired enlargement, after the screw 119 has first been adjusted by means of the screw 122 to a distance from the swinging center of the arm 112 corresponding to the length of the pattern last.

If the arm 112 is taken to be adjusted into a position paralleling the direction of movement of the table 7, the bell crank lever 105, 106 will at an adjustment of the table 7 become supported with its arm 106 in the slot 111 of the arm 112, so that the bell crank lever is prevented from turning. Consequently, the slide 10 and the pattern last will participate in the feeding movement of the table 7, and will move at the same rate as the table 7, no enlargement or reduction then taking place. If the lasts are to be manufactured in a size deviating from that of the pattern last, the arm 112 is adjusted by means of the screw 119 into a corresponding angular position. During the feeding operation, the bell crank lever 105, 106 will then turn at a simultaneous displacement of its swinging pin 104 and thus of the slide 10 in a forward or rearward direction depending on in what direction the arm 112 was adjusted, the slide 10 and the pattern last being then displaced relatively to the table 7 in correspondence to the enlargement or reduction established by the angular adjustment of the arm 112.

What is claimed is:

1. A machine for the manufacture of shoe lasts comprising a rotary model last holder, a rotary last blank holder, a model follower, a cutting tool holder, a primary width grading mechanism operated by the model follower, a secondary width grading mechanism connected with the primary width grading mechanism and operating to impart to the cutting tool holder an additional motion increment superimposed on the motion imparted by the primary width grading mechanism, said secondary width grading mechanism comprising a rotary member adapted to rotate in synchronism with the last blank holder, an actuating member in operative engagement with the primary width grading mechanism, and means for transforming the movement of said rotary member into an oscillating movement of said actuating member, means for feeding the last blank holder lengthwise, and means actuated by said feeding means for continuously changing the oscillation amplitude of said actuating member.

2. A machine as claimed in claim 1, in which the actuating member is adapted to oscillate about a middle position in which the additional motion increment imparted by the secondary width grading mechanism is zero.

3. A machine as claimed in claim 1, in which there is provided a second secondary width grading mechanism operating separately or in conjunction with the other width grading mechanism to impart to the cutting tool holder a variable additional motion increment superimposed on the primary width grading motion, said second secondary width grading mechanism comprising a rotary member, means for rotating said member in synchronism with the last blank holder, an actuating member connected with the primary width grading mechanism and operating to superimpose an additional increment on the primary width grading motion, and means for transforming the movement of said rotary member into a reciprocating movement of said actuating member.

4. A machine for the manufacture of shoe lasts comprising a rotary model last holder, a rotary last blank holder, a model follower, a cutting tool holder, a primary width grading mechanism for enlarging and reduction grading comprising a motion transmission member cooperating with the model follower and a setting member cooperating with said motion transmission member and adjustable for varying the primary grading motion, a secondary width grading mechanism cooperating with the primary width grading mechanism and operating periodically to superimpose a variable additional increment on the primary width grading motion for any setting of the primary width grading mechanism, said secondary width grading mechanism comprising a rotary member, means for rotating said member in timed relation to the rotation of the model, an actuating member in operative engagement with the primary width grading mechanism, and means for transforming the movement of said rotary member into an oscillating movement of said actuating member.

5. A machine as claimed in claim 4, in which the setting member is swingably mounted on a slidable actuating member of the secondary width grading mechanism, the setting member being angularly displaceable for varying the primary grading motion and parallelly displaceable by said actuating member for varying the secondary grading motion.

References Cited in the file of this patent
UNITED STATES PATENTS

| | | |
|---|---|---|
| 1,362,182 | Potter | Dec. 14, 1920 |
| 1,362,185 | Boynton | Dec. 14, 1920 |
| 1,407,728 | Whipple | Feb. 28, 1922 |
| 1,536,721 | Magoon | May 5, 1925 |
| 1,733,207 | Ryan et al. | Oct. 29, 1929 |
| 1,798,926 | Black et al. | Mar. 31, 1931 |
| 1,860,723 | Ryan | May 31, 1932 |
| 1,946,253 | Windle | Feb. 6, 1934 |
| 2,154,725 | Clausing | Apr. 18, 1939 |